(12) United States Patent
Stojanovski et al.

(10) Patent No.: US 11,317,377 B2
(45) Date of Patent: *Apr. 26, 2022

(54) MULTICAST-BASED GROUP COMMUNICATION IN AD HOC ARRANGEMENTS OF WIRELESS DEVICES

(71) Applicant: Apple Inc., Cupertino, CA (US)

(72) Inventors: Alexandre Stojanovski, Paris (FR); Muthaia Venkatachalam, Beaverton, OR (US); Maik Bienas, Braunschweig (DE); Achim Luft, Braunschweig (DE); Pingping Zong, Randolph, NJ (US)

(73) Assignee: Apple Inc., Cupertino, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 16/833,895

(22) Filed: Mar. 30, 2020

(65) Prior Publication Data

US 2020/0314801 A1   Oct. 1, 2020

Related U.S. Application Data

(63) Continuation of application No. 15/691,723, filed on Aug. 30, 2017, now Pat. No. 10,609,680, which is a
(Continued)

(51) Int. Cl.
*H04W 72/00*   (2009.01)
*H04B 7/0456*   (2017.01)
(Continued)

(52) U.S. Cl.
CPC ........ *H04W 72/005* (2013.01); *H04B 7/0452* (2013.01); *H04B 7/0486* (2013.01);
(Continued)

(58) Field of Classification Search
CPC .............. H04W 72/005; H04W 76/30; H04W 76/23; H04W 76/14; H04W 76/27; H04W 76/10;
(Continued)

(56) References Cited

U.S. PATENT DOCUMENTS

2003/0112778 A1   6/2003   Lundby et al.
2005/0122923 A1   6/2005   Jang et al.
(Continued)

FOREIGN PATENT DOCUMENTS

EP   2506450 A2   10/2012

OTHER PUBLICATIONS

Non-Final Office Action dated Feb. 8, 2017 for U.S. Appl. No. 14/765,285.
(Continued)

*Primary Examiner* — Jung H Park
(74) *Attorney, Agent, or Firm* — Kowert, Hood, Munyon, Rankin & Goetzel, P.C.

(57) ABSTRACT

Wireless communication devices may directly communicate within groups of wireless communication devices using Layer-2 communications to implement "push-to-talk" type applications. In one implementation, a method may include generating a floor request signaling message to take control of a communication channel for a group. After transmitting data relating to the communications, a floor release signaling message may be generated and transmitted a number of times.

20 Claims, 10 Drawing Sheets

Related U.S. Application Data continuation of application No. 14/765,285, filed as application No. PCT/US2013/074673 on Dec. 12, 2013, now Pat. No. 9,788,303.

(60) Provisional application No. 61/771,698, filed on Mar. 1, 2013.

(51) Int. Cl.

| | | |
|---|---|---|
| *H04B 7/0452* | (2017.01) | |
| *H04M 15/00* | (2006.01) | |
| *H04W 36/14* | (2009.01) | |
| *H04W 36/22* | (2009.01) | |
| *H04L 5/00* | (2006.01) | |
| *H04L 12/741* | (2013.01) | |
| *H04B 7/06* | (2006.01) | |
| *H04W 24/10* | (2009.01) | |
| *H04W 72/04* | (2009.01) | |
| *H04W 72/08* | (2009.01) | |
| *H04L 29/06* | (2006.01) | |
| *H04L 29/08* | (2006.01) | |
| *H04W 4/10* | (2009.01) | |
| *H04W 12/02* | (2009.01) | |
| *H04W 12/04* | (2021.01) | |
| *H04W 24/02* | (2009.01) | |
| *H04W 24/08* | (2009.01) | |
| *H04L 12/18* | (2006.01) | |
| *H04L 45/74* | (2022.01) | |
| *H04L 65/65* | (2022.01) | |
| *H04L 65/80* | (2022.01) | |
| *H04L 67/02* | (2022.01) | |
| *H04L 65/4038* | (2022.01) | |
| *H04W 52/24* | (2009.01) | |
| *H04W 72/10* | (2009.01) | |
| *H04W 16/14* | (2009.01) | |
| *H04W 36/16* | (2009.01) | |
| *H04J 3/12* | (2006.01) | |
| *H04W 48/10* | (2009.01) | |
| *H04W 48/20* | (2009.01) | |
| *H04L 25/03* | (2006.01) | |
| *H04W 76/23* | (2018.01) | |
| *H04W 76/14* | (2018.01) | |
| *H04W 76/27* | (2018.01) | |
| *H04W 76/10* | (2018.01) | |
| *H04W 76/20* | (2018.01) | |
| *H04W 76/30* | (2018.01) | |
| *H04W 4/80* | (2018.01) | |
| *H04W 88/06* | (2009.01) | |
| *H04W 88/02* | (2009.01) | |
| *H04W 88/08* | (2009.01) | |
| *H04W 84/18* | (2009.01) | |
| *H04W 4/06* | (2009.01) | |

(52) U.S. Cl.
CPC ............ *H04B 7/0626* (2013.01); *H04J 3/12* (2013.01); *H04L 5/0037* (2013.01); *H04L 12/184* (2013.01); *H04L 25/03* (2013.01); *H04L 45/74* (2013.01); *H04L 65/4038* (2013.01); *H04L 65/608* (2013.01); *H04L 65/80* (2013.01); *H04L 67/02* (2013.01); *H04M 15/8044* (2013.01); *H04W 4/10* (2013.01); *H04W 12/02* (2013.01); *H04W 12/04* (2013.01); *H04W 16/14* (2013.01); *H04W 24/02* (2013.01); *H04W 24/08* (2013.01); *H04W 24/10* (2013.01); *H04W 36/14* (2013.01); *H04W 36/165* (2013.01); *H04W 36/22* (2013.01); *H04W 48/10* (2013.01); *H04W 48/20* (2013.01); *H04W 52/244* (2013.01); *H04W 72/044* (2013.01); *H04W 72/0406* (2013.01); *H04W 72/085* (2013.01); *H04W 72/087* (2013.01); *H04W 72/10* (2013.01); *H04W 76/10* (2018.02); *H04W 76/14* (2018.02); *H04W 76/20* (2018.02); *H04W 76/23* (2018.02); *H04W 76/27* (2018.02); *H04W 76/30* (2018.02); *H04W 4/06* (2013.01); *H04W 4/80* (2018.02); *H04W 84/18* (2013.01); *H04W 88/02* (2013.01); *H04W 88/06* (2013.01); *H04W 88/08* (2013.01); *Y02B 70/30* (2013.01); *Y02D 30/70* (2020.08)

(58) Field of Classification Search
CPC ..... H04W 76/20; H04W 48/10; H04W 48/20; H04W 72/0406; H04W 4/10; H04W 12/02; H04W 12/04; H04W 24/02; H04W 24/08; H04W 52/244; H04W 72/087; H04W 72/10; H04W 16/14; H04W 36/165; H04W 24/10; H04W 72/044; H04W 72/085; H04W 36/14; H04W 36/22; H04W 4/80; H04W 4/06; H04W 88/06; H04W 88/02; H04W 88/08; H04W 84/18; H04L 25/03; H04L 65/608; H04L 65/80; H04L 67/02; H04L 65/4038; H04L 12/184; H04L 5/0037; H04L 45/74; H04M 15/8044; H04J 3/12; H04B 7/0626; H04B 7/0486; H04B 7/0452; Y02B 70/30; Y02D 30/70

See application file for complete search history.

(56) References Cited

U.S. PATENT DOCUMENTS

| | | | |
|---|---|---|---|
| 2005/0135305 A1 | 6/2005 | Wentik | |
| 2006/0094455 A1 | 5/2006 | Hannu et al. | |
| 2006/0285529 A1* | 12/2006 | Hares | H04L 45/16 370/338 |
| 2007/0274233 A1 | 11/2007 | Ptashk et al. | |
| 2009/0059831 A1 | 3/2009 | Li et al. | |
| 2009/0147958 A1* | 6/2009 | Calcaterra | H04L 9/0822 380/260 |
| 2011/0149822 A1 | 6/2011 | Sammour et al. | |
| 2012/0036273 A1 | 2/2012 | Badger | |
| 2012/0166568 A1 | 6/2012 | Helbling et al. | |
| 2013/0196706 A1* | 8/2013 | Patel | H04W 4/10 455/518 |
| 2013/0315164 A1* | 11/2013 | Arur | H04W 76/40 370/329 |

OTHER PUBLICATIONS

Notice of Allowance dated Nov. 21, 2019 for U.S. Appl. No. 15/691,723.
Non-Final Office Action dated Aug. 30, 2017 for U.S. Appl. No. 15/691,723.
Final Office Action dated Sep. 6, 2019 for U.S. Appl. No. 15/691,723.
Notice of Allowance dated Jun. 5, 2017 for U.S. Appl. No. 14/765,285.
European Search Report dated Nov. 15, 2016 for related European Application EP13876384.2 based on corresponding PCT Application PCT/US2013/074673, 10 pgs.
International Search Report and Written Opinion for PCT/US2013/074673, dated Mar. 20, 2014, 13 pgs.
3rd Generation Partnership Project; Technical Specification Group Services and System Aspects; "Feasibility Study for Proximity Services (ProSe)", Release 12, 3GPP TR 22.803, V12.2.0, Jun. 2013, 45 pgs.

(56) References Cited

OTHER PUBLICATIONS

3rd Generation Partnership Project; Technical Specification Group Services and System Aspects; "Group Communication System Enablers for LTE" (GCSE_LTE), Release 12, 3GPP TS 22.468, V12.0.0, Jun. 2013, 22 pgs.

Open Mobile Alliance, "Push to Talk Over Cellular (PoC) Architecture"; Approved Version 2.1; Aug. 2011; 67 pgs.

Wi-Fi Alliance, "Wi-Fi Certified Wi-Fi Direct, Personal, Portable Wi-Fi to Connect Devices Anywhere, Any Time"; Oct. 2010, 6 pgs.

3rd Generation Partnership Project; Technical Specification Group Services and System Aspects; "Study on Architecture Enhancements to Support Proximity Services (ProSe)", Release 12, 3GPP TR 23.703, V0.2.0, Apr. 2013, 26 pgs.

\* cited by examiner

MULTICAST-BASED GROUP COMMUNICATION IN AD HOC ARRANGEMENTS OF WIRELESS DEVICES

RELATED APPLICATIONS

This application is a continuation of U.S. application Ser. No. 15/691,723 filed on Aug. 30, 2017, which is now U.S. Pat. No. 10,609,680 dated Mar. 31, 2020, which is a continuation of U.S. application Ser. No. 14/765,285 filed on Jul. 31, 2015, which is now U.S. Pat. No. 9,788,303 dated Oct. 10, 2017, which claims priority of International Patent Application PCT/US2013/074673 filed on Dec. 12, 2013, which claims benefit of U.S. Provisional Application 61/771,698 filed on Mar. 1, 2013, the contents of which are incorporated by reference in their entirety.

BACKGROUND

Wireless networks may provide network connectivity to mobile communication devices, such as smart phones. The network connectivity may be provided through radio interfaces. Typically, the devices may connect to a network through an access point that is part of the network infrastructure. For example, a device may connect to a cellular network via a cellular base station or a wireless local area network (WLAN) via a WLAN access point (e.g., a WiFi access point).

Some techniques may allow devices to establish direct communication paths with one another (e.g., without going through a cellular base station or WiFi access point). For example, devices that are located in proximity to one another may discover one another and subsequently establish direct communication paths with one another.

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

Techniques described herein may provide for communication between ad hoc groups of communication devices, called "user equipment" (UE) herein, that are connected by direct communication paths. The communication may include "push-to-talk" type voice conferences between a group of UEs. In this type of communication, a user of a first UE, in a group of UEs, may wish to broadcast a message to other UEs in the group. Before the first UE in the group broadcasts the message, the first UE may communicate with the other UEs in the group to reserve the ability to broadcast the message (called "taking the floor" or "reserving the floor" herein). When the first UE has finished transmitting the message, the first UE may "release the floor," allowing other UEs in the group to take the floor.

The ad hoc groups described herein may communicate using Layer-2 (e.g., the data link layer or media access control (MAC) sublayer) communications in the Open Systems Interconnection (OSI) model. That is, the ad hoc groups may not require Internet Protocol (IP)-based communications. A call transaction (e.g., broadcasting a voice message) may be initiated by broadcasting multiple "floor request" signaling messages and ended by broadcasting multiple "floor release" signaling messages. When there is an ongoing call transaction for a group (i.e., there is an active sender that has the floor), other UEs in the group may abstain from contending for the floor. The UEs may, however, contend for the medium (e.g., for the Layer-2 radio channel) for the purpose of sending Layer-2 traffic related to other applications or to other groups.

One implementation described herein may include a wireless communication device controlling wireless communications via direct mode communications, by the wireless communication device and with one or more other devices, the wireless communications device comprising processing circuitry to: generate a Layer-2 frame that contains a floor request signaling message to take control of a communication channel for a group that includes the one or more other devices. The Layer-2 frame that contains the floor request signaling message including a header that includes a Layer-2 destination address that is assigned to the group, and value identifying the floor request signaling message. The processing circuitry may further transmit the Layer-2 frame including the floor request signaling message; and transmit, after taking control of the communication channel based on the transmission of the Layer-2 frame including the floor request signaling message, one or more Layer-2 frames that include data relating to the direct mode communications.

In an implementation, the wireless communication device may generate a Layer-2 frame that contains a floor release signaling message to release control of the communication channel for the group, the Layer-2 frame that contains the floor release signaling message including: a header that includes the Layer-2 destination address that is assigned to the group, and a value identifying the floor release signaling message; and transmit, after the transmission of the one or more Layer-2 frames that include the data relating to the direct mode communication, the Layer-2 frame that includes the floor release signaling message.

The generation of the floor request signaling message may be performed in response to a user of the device initiating transmission of a message in a push-to-talk application. Further, the group may associated with a shared encryption key, and wherein the processing circuitry is further to: encrypt, using the shared encryption key, the data relating to the direct mode communications.

In an implementation, the processing circuitry may be further to: refrain from transmitting the floor request signaling message during a period of time after receiving a floor request signaling message from any one of the one or more other devices and before receiving a corresponding floor release signaling message. Further, the floor request signaling message and the floor release signaling message may each additionally include: an application layer group identifier to uniquely identify the group. Additionally, the application layer identifier may include a session initiation protocol (SIP)-uniform resource identifier (URI).

The floor request signaling message and the floor release signaling message may each be transmitted a plurality of times.

In one implementation, a method for wirelessly communicating via direct mode communications, by a device and with one or more other devices, may include generating a Layer-2 frame that contains a floor request signaling message to take control of a communication channel for a group that includes the one or more other devices; transmitting the Layer-2 frame including the floor request signaling message; transmitting, after taking control of the communication channel based on the transmission of the Layer-2 frame including the floor request signaling message, one or more Layer-2 frames that include data relating to the direct mode communications; generating, a Layer-2 frame that contains a floor release signaling message to release control of the communication channel for the group; and transmitting, after the transmission of the one or more Layer-2 frames that include the data relating to the direct mode communication, the Layer-2 frame that includes the floor release signaling message.

In an implementation, the Layer-2 frame that contains the floor request signaling message may include a first header that includes a Layer-2 destination address that is assigned to the group, and a value identifying the floor request signaling message. Additionally, the Layer-2 frame that contains the floor release signaling message may include a second header that includes the Layer-2 destination address that is assigned to the group, and a value identifying the floor release signaling message.

In yet another implementation, a wireless communication device may control wireless communications via direct mode communications. The wireless communications device may include a memory to store instructions; and at least one processor to execute the instructions stored by the memory to: generate a Layer-2 frame that contains a floor request signaling message to take control of a communication channel for a group that includes the one or more other devices, the Layer-2 frame that contains the floor request signaling message including a header that includes a Layer-2 destination address that is assigned to the group, and a value identifying the floor request signaling message; transmit the Layer-2 frame including the floor request signaling message; and transmit, after taking control of the communication channel based on the transmission of the Layer-2 frame, one or more Layer-2 frames that include data relating to the direct mode communications.

In yet another implementation, a wireless communication device may comprise one or more memories to store: a MAC address associated with a group of which a user, of the wireless communication device, is a member; an application layer user identifier associated with the user, and computing device executable instructions. At least one processor may execute the instructions stored by the one or more memories to: receive an indication, from the user, to transmit a message via a push-to-talk application, the message destined for other wireless communication devices associated with the group; transmit, when a communication floor associated with the group is open and when the wireless communication device has permission to use a Layer-2 communication medium, a Layer-2 frame containing a floor request signaling message, the Layer-2 frame including the MAC address as a destination address of the Layer-2 frame and the floor request signaling message including the application layer user identifier; transmit the Layer-2 frame containing the floor request signaling message; and transmit a Layer-2 frame containing a floor release signaling message to indicate that the communication floor is available for the group.

In yet another implementation, a wireless communication device may comprise means for storing a MAC address associated with a group of which a user, of the wireless communication device, is a member; means for storing an application layer user identifier associated with the user; means for receiving an indication, from the user, to transmit a message as part of a push-to-talk application, the message destined for other wireless communication devices associated with the group; means for transmitting, when a communication floor associated with the group is open and when the wireless communication device has permission to use a Layer-2 communication medium, a Layer-2 frame containing a floor request signaling message, the Layer-2 frame including the MAC address as a destination address of the Layer-2 frame and the floor request signaling message include an application layer user identifier; means for transmitting the Layer-2 frame containing the floor request signaling message; and means for transmitting a Layer-2 frame containing a floor release signaling message to indicate that the communication floor is available for the group.

Figure 1:
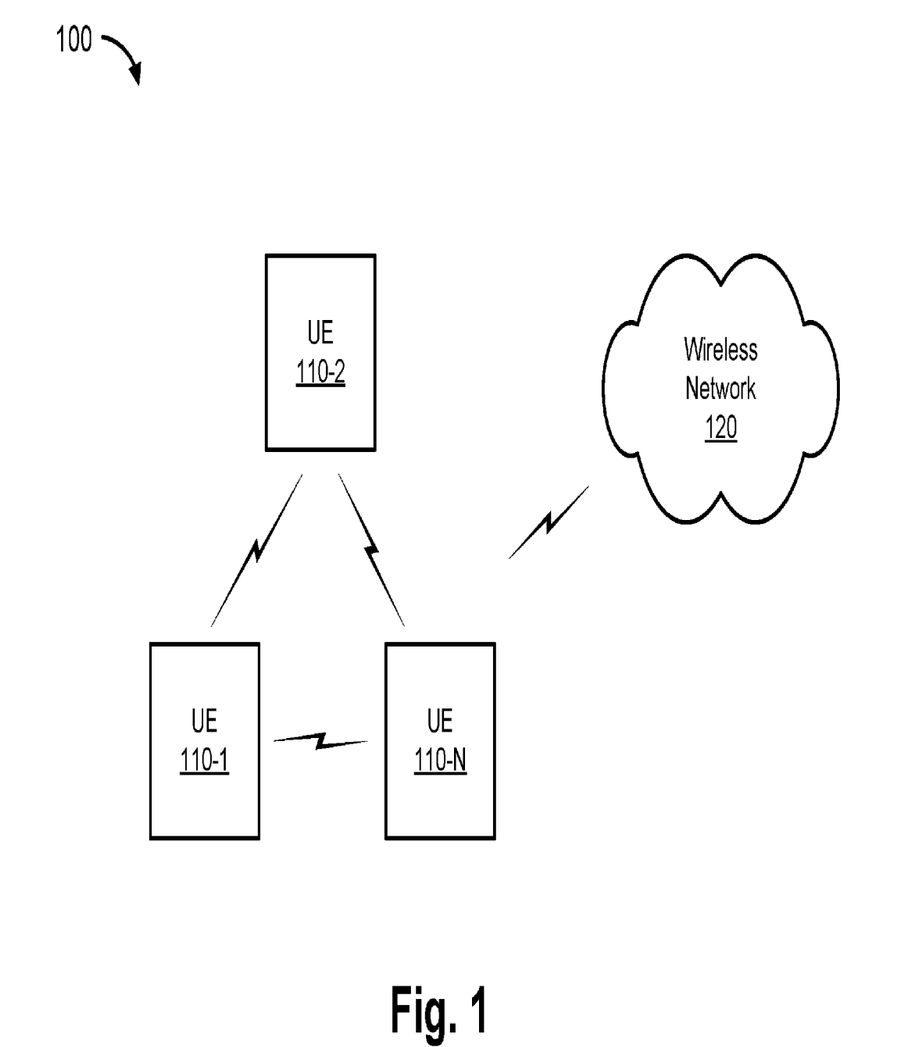
FIG. 1 is a diagram of an example environment in which systems and/or methods described herein may be implemented.

FIG. 1 is a diagram of an example environment 100 in which systems and/or methods described herein may be implemented. As illustrated, environment 100 may include one or more UEs 110-1 through 110-N (referred to collectively herein as "UEs 110" or individually as "UE 110") and wireless network 120 to provide network connectivity to UEs 110 and/or with other networks.

UEs 110 may include portable computing and communication devices, such as a personal digital assistant (PDA), a smart phone, a cellular phone, a laptop computer with connectivity to a cellular wireless network, a tablet computer, etc. UEs 110 may also include non-portable computing devices, such as desktop computers, consumer or business appliances, or other devices that have the ability to connect to wireless network 120. UEs 110 may connect, through a radio link, to wireless network 120. UEs 110 may also connect directly to one another using a direct communication path (e.g., via direct mode communication that does not use wireless network 120).

Wireless network 120 may include one or more networks that provide wireless network connectivity to UEs 110. For example, wireless network 120 may represent a wireless network that provides cellular wireless coverage or a network accessed through WiFi access points (e.g., Institute of Electrical and Electronics Engineers' (IEEE) 802.11 access points). In some implementations, wireless network 120 may be associated with a Long Term Evolution (LTE) network.

UEs 110 that are in the vicinity of one another (e.g., within direct radio range of one another when using radio transceivers of UEs 110) may form ad hoc networks with one another using direct mode communications. The term "ad hoc network," as used herein, may refer to a decentralized type of wireless network that does not rely on pre-existing infrastructure, such as routers or access points, to facilitate the network. An ad hoc network may be formed dynamically by UEs discovering one another by sending and receiving discovery request messages. The ad hoc networks described herein may be implemented at the Layer-2 network layer (e.g., at the data link/MAC sublayer), in which IP-based routing may not be used and/or may not be necessary.

In one implementation, UEs in an ad-hoc network may be associated with predefined groups and may directly broadcast messages (e.g., messages that encode voice signals) to one another. For example, in a push-to-talk application, UEs 110 in a particular predefined group, such as a group of public safety personnel (e.g., firefighters, police officers, etc.), may broadcast real-time audio to other members in the group.

Figure 2:
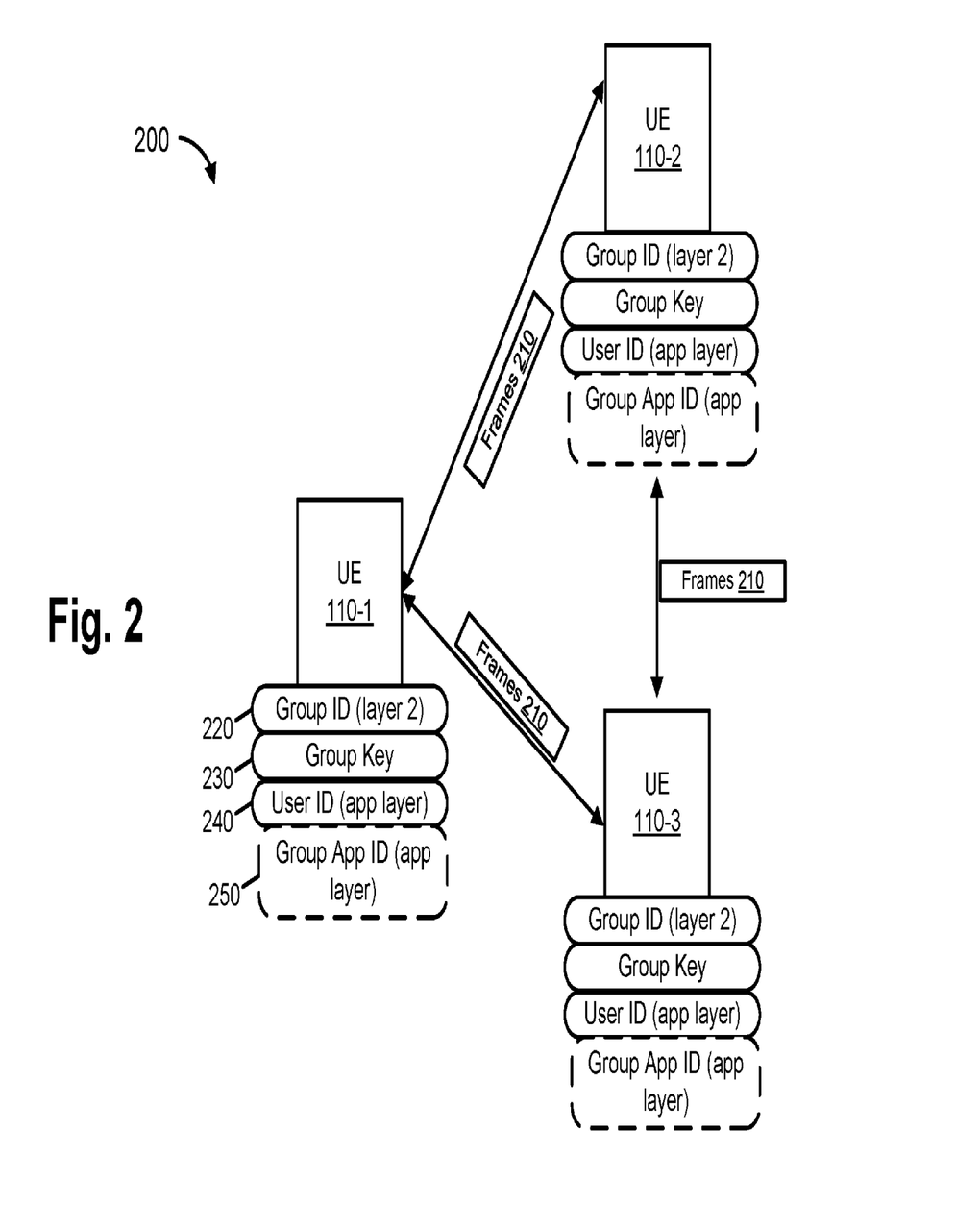
FIG. 2 is a diagram illustrating an example ad hoc network.

FIG. 2 is a diagram illustrating an example ad hoc network 200 of UEs. In this example, three UEs are illustrated: UEs 110-1, 110-2, and 110-3 (sometimes referred to herein collectively as "UEs 110"). UEs 110 may communicate at the Layer-2 network level (e.g., using MAC frames and without IP-based communications) by wirelessly broadcasting Layer-2 frames 210. Each frame 210 may include a fixed or variable sized data unit that includes Layer-2 addressing information (e.g., six octet MAC addresses). In ad hoc network 200, a subset of UEs 110 may be assigned to a predefined group. UEs 110, in a particular group, may securely communicate among one another by encrypting data using a shared group key.

As illustrated, UEs 110, such as UE 110-1, may be associated with a number of parameters 220-250 that may be used to implement direct mode communications (i.e., without using an access network, such as wireless network 120) between groups of UEs 110. The parameters may include, for each UE 110: group identifier (ID) 220, group key 230, user identifier 240, and group application identifier 250. Parameters 220-250 may be parameters that are stored at UEs 110 during manufacture, during provisioning of UEs 110, or dynamically updated at UEs 110, such as via communication with a server device coupled to wireless network 120.

Group identifier 220 may include a Layer-2 address value. In one implementation, group identifier 220 may include a six octet MAC group address. A MAC group addresses may be distinguished from individual MAC addresses by the value of the least significant bit of the first octet of the MAC address. The bit may be set to zero for an individual MAC address and to one for a group address. In other implementations, group identifier 220 may be set to the value of a broadcast MAC address (e.g., all one bits). In this situation, other values, such as group application identifier 250 may be used to identify a particular frame as corresponding to a particular group. UEs 110 may store a separate group identifier 220 for each group that may potentially be joined as part of direct mode communications.

Group key 230 may include a value used to enable secure communications between UEs 110 in a group. In one implementation, group key 230 may include a symmetric encryption key. Alternatively or additionally, group key 230 may include a value that is used to derive a symmetric encryption key. Group key 230 may be the same value for all members of a group (e.g., a "shared" key).

User identifier 240 may include an application layer identifier of a user associated with UE 110-1. In one implementation, user identifier 240 may include a session initiation protocol (SIP)-uniform resource identifier (URI) (SIP-URI). Each SIP-URI may be a variable length identifier that is globally unique. User identifier 240 may be an application layer identifier that may be changed, at a particular UE, in response to different users using the UE. Additionally, a particular user, that is using multiple UEs 110, may be associated with the same user identifier 240 at each of the multiple UEs 110.

Group application identifier 250 may include an application layer identifier of a group associated with the user of UE 110 (e.g., the user may be a member of the group). In one implementation, group application identifier 250 may include a globally unique SIP-URI. In some implementations, group application identifier 250 may be an optional parameter that may be included for disambiguation purposes if group identifier 220 is not globally unique. Each group application identifier 250 may be associated with a single group identifier 220.

As an example of an assignment of parameters 220-250, a particular user may be identified, via user identifier 240, by the SIP-URI "sip:john.doe@firedept.net." The user may be a member of a group, such as the group "sip:fire_brigade.group@firedept.net" (group application identifier 250). In addition to "sip:john.doe@firedept.net," this particular group may include three other members: "sip:bill.smith@firedept.net," "sip:mary.doe@firedept.net," and "sip:linda.smith@firedept.net." UEs 110 of all members of the group may include an identical group key 230 and group identifier 220.

Figure 3A:
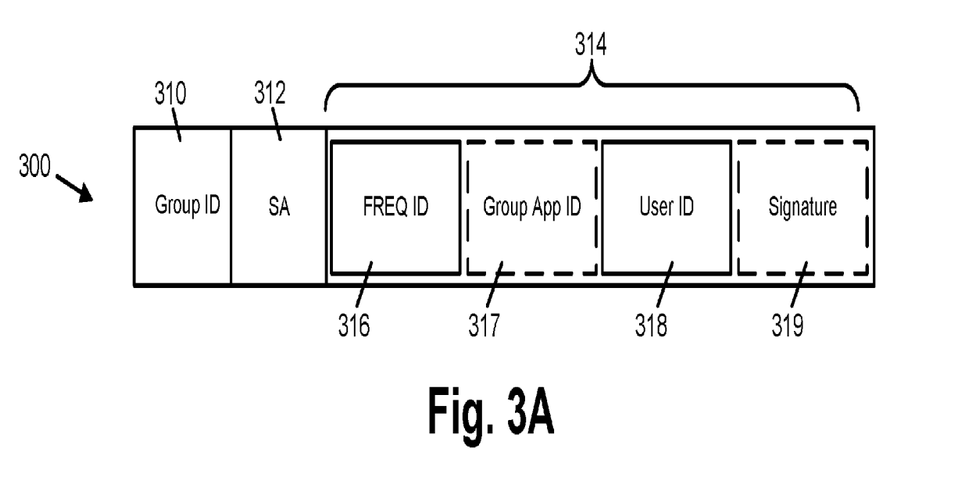
FIGS. 3A, 3B, and 3C are diagrams illustrating request formats for signaling messages that may be used to implement direct mode communications between user equipment (UE)
Figure 3B:
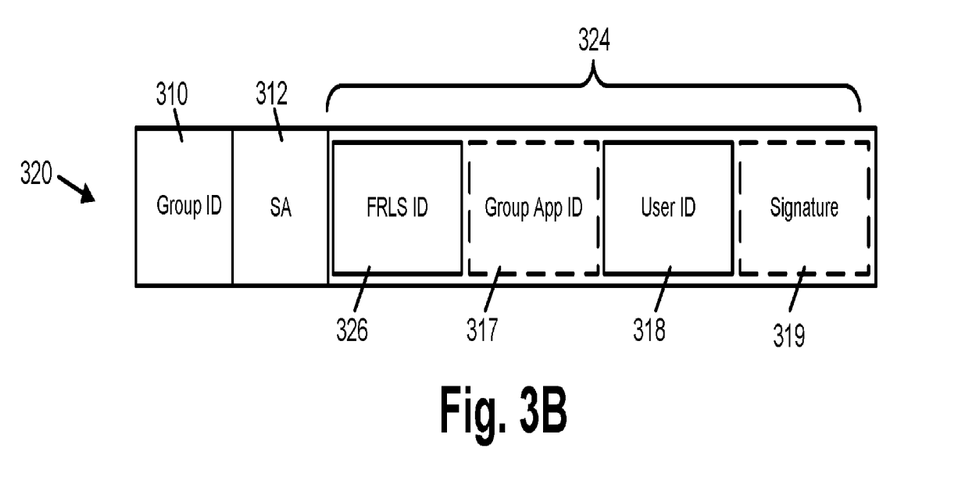
Figure 3C:
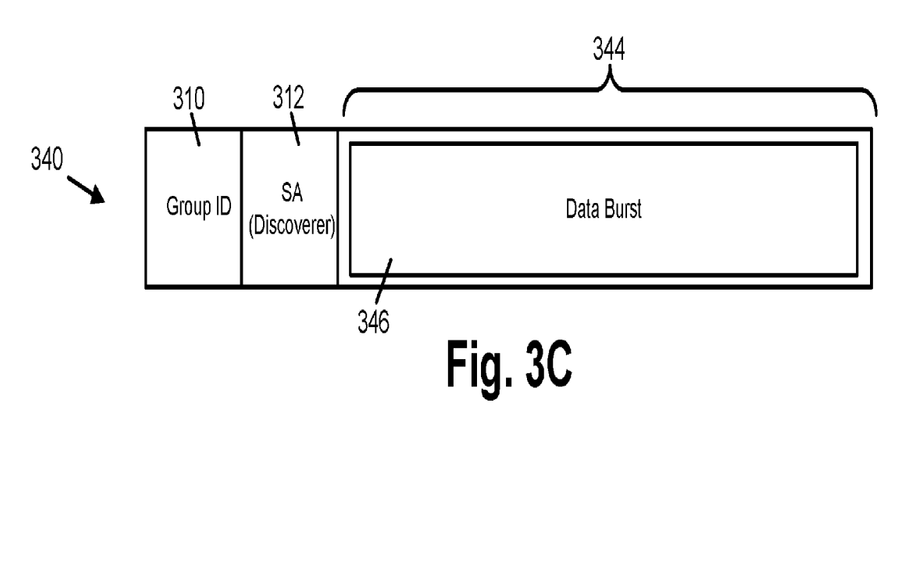

FIGS. 3A, 3B, and 3C are diagrams illustrating request formats for signaling messages, included within frames 210, that may be used to implement direct mode communications between UEs 110. The direct mode communications may include a push-to-talk type broadcast. FIG. 3A illustrates the format of a message, called a floor request signaling message herein, that may be used to reserve the communication channel for a group. FIG. 3B illustrates the format of a message, called a floor release signaling message herein, that may be used to release the communication medium for a group. FIG. 3C illustrates the format of a message, called a talk burst message herein, that may be used to transmit content for direct mode communications, such as a push-to-talk broadcast (e.g., of audio content) application. A call transaction (e.g., broadcasting a voice message) may be initiated by broadcasting multiple floor request signaling messages (e.g., as shown in FIG. 3A) and ended by broadcasting multiple "floor release" signaling messages (e.g., as shown in FIG. 3B).

As illustrated in FIG. 3A, a Layer-2 frame 300 may include group identifier (ID) 310, source address (SA) 312, and payload 314. Payload 314 may include a number of fields that define a floor request signaling message, shown as: floor request (FREQ) identifier 316, group application identifier 317, user identifier 318, and signature 319.

Group identifier 310 may correspond to group identifier 220 (shown in FIG. 2) and may include a Layer-2 MAC address value that corresponds to the particular group for which the floor request is directed. As mentioned previously, in some implementations, a single group identifier 310 may correspond to multiple groups. In this case, group application identifier 317 may be used to disambiguate between the groups. Group identifier 310 may act as the destination address for frame 300. Source address 312 may be set to the address, such as the peer-to-peer address (e.g., Layer-2 MAC address), of the UE that generates frame 300.

Floor request identifier 316, of payload 314, may include a predefined value that identifies the signaling message as a floor request message. Group application identifier 317 may correspond to group application identifier 250 (shown in FIG. 2) and may include the application layer identifier (e.g., a SIP-URI) of the group for which the floor request is directed. As mentioned, in some implementations in which group identifier 310 is unique, group application identifier 317 may not be used. User identifier 318 may correspond to user identifier 240 (shown in FIG. 2) and may include the application layer identifier (e.g., a SIP-URI) of the user of the UE that is requesting the floor. User identifier 318 may be used to uniquely identify the particular user that is requesting the floor (e.g., to allow other UEs 110 in the group to display a visual indicator corresponding to the user that is speaking).

Signature 319 may include information that may be used to authenticate the floor request signaling message as being issued by the user associated with user identifier 318. In one implementation, signature 319 may be a signature generated using public-key cryptography techniques. In this implementation, the public key associated with the signing user may also be stored by each UE 110 that is a member of the corresponding group. In some implementations, signature 319 may not be used in frame 300.

As illustrated in FIG. 3B, Layer-2 frame 320 may include group identifier 310, source address 312, and payload 324. Payload 324 may include a number of fields that define a floor release message, shown as: floor release (FRLS) identifier 326, group application identifier 317, user identifier 318, and signature 319. Group application identifier 317, user identifier 318, and signature 319 may include values as described with reference to FIG. 5A. That is, group identifier 317 may identify the group (an application layer identifier) for which the floor is being released, user identifier 318 may identify the user associated with the floor release (i.e., the user that currently has control of the floor), and signature 319 may be used to authenticate the floor release signaling message as being issued by the user corresponding to user identifier 318.

Floor release identifier 326, of payload 314, may include a predefined value that identifies the frame as a frame carrying a floor release message. UEs 110 that receive floor release message 300 may examine floor release identifier 326 to determine that the frame corresponds to a floor release message.

As illustrated in FIG. 3C, a frame 340 may include a talk burst message that may include a data burst that is used to transmit the substantive content for a direct mode push-to-talk application. Frame 340 may include group identifier 310 (as described with respect to FIG. 3A), source address 312 (as described with respect to FIG. 3A), and payload 344. Payload 344 may include data burst 346, which may correspond to the substantive content for the application. For example, a user that has the floor in a direct mode push-to-talk application may speak a number of words or phrases. The corresponding audio may be received by the UE, associated with the user, digitally encoded, and transmitted in one or more data burst messages. In some implementations, to obtain privacy within a group, each data burst 346 may be encrypted, such as using a symmetric encryption technique in which group key 230 is used to encrypt each data burst 346.

Although a data burst 346 is primarily described herein as transporting audio information, in other possible implementations, applications other than audio-based push-to-talk applications may be implemented using concepts described herein. For example, an application using floor control, as described herein, may include a video application, a gaming application, or another type of application.

Figure 4:
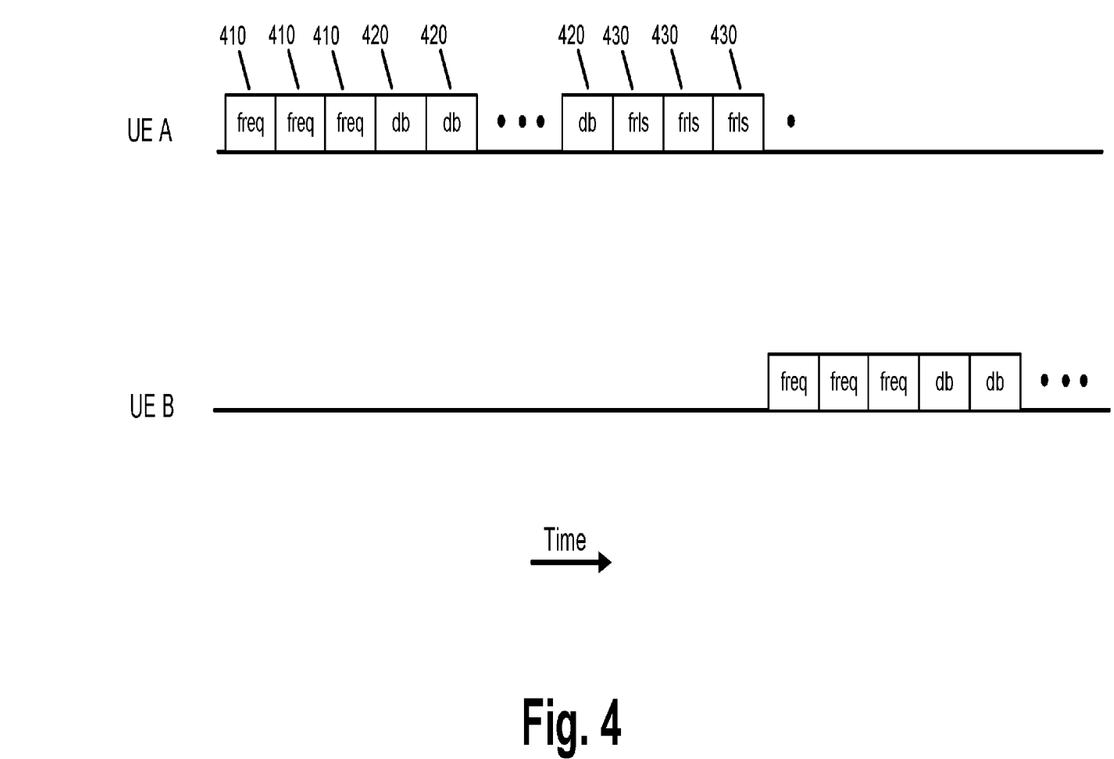
FIG. 4 is a diagram illustrating an example of communications relating to reserving and releasing the floor for direct mode communications in a group.

FIG. 4 is a diagram illustrating an example of communications relating to reserving and releasing the floor for direct mode communications in a group. As illustrated, a first UE ("UE A") and a second UE ("UE B") may be participating in direct mode push-to-talk communications as part of a group.

The user of UE A may desire take the floor to broadcast an audio message to the group. The user may, for example, select a physical or graphical "talk" button provided by UE A, to indicate the user's desire to broadcast the audio message. In response, UE A, when the floor is free (not reserved) or when the floor becomes free, may take control of the medium (e.g., at the Layer-2 MAC sublayer), and then subsequently take control of the floor corresponding to the group. As illustrated, taking control of the floor corresponding to the group may include transmitting multiple floor request ("freq") signaling messages 410. Each floor request signaling message 410 may be transmitted within a frame 300 (FIG. 3). Multiple floor request signaling messages 410 may be transmitted to increase the robustness of the floor request operation in situations in which the medium is noisy (i.e., frames may be dropped or received with errors). Although three floor request signaling message 410 are illustrated as being successively transmitted in FIG. 4, in other implementations, more or fewer floor request signaling messages 410 may be transmitted. In one possible implementation, the number of floor request signaling messages to transmit may be determined based on the current quality of the transmission medium (e.g., more redundant floor request may be transmitted when the error rate of frame transmission is high).

After transmission of floor request signaling message 410, UE 410 may transmit the substantive content for a direct mode audio broadcast. As illustrated, a number of data burst ("db") messages 420 may be transmitted. Each data burst message 420 may include a portion of the audio broadcast, which may be reassembled and played by receiving UEs 110 within the group. The audio broadcast data within each data burst message 420 may be encrypted using an encryption key associated with the group (e.g., group key 230). Accordingly, only UEs 110 that are members of the group may be able to decrypt the audio broadcast data.

When the user of UE A finishes speaking (e.g., as indicated by the user releasing the "talk" button), UE A may transmit multiple floor release ("frls") signaling messages 430. Each floor release signaling message 430 may correspond to frame 320 (shown in FIG. 3). Multiple floor release signaling messages 430 may be transmitted to increase the robustness of the floor release operation in situations in which the medium is noisy. Although three floor release signaling messages 430 are illustrated as being successively transmitted in FIG. 4, in other implementations, more or fewer floor release signaling messages 430 may be transmitted. As with floor request signaling messages 410, in one possible implementation, the number of redundant floor release signaling messages to transmit may be determined based on the current quality of the transmission medium. When the floor is released, another UE, such as UE B, may be free to take control of the floor for the group.

Figure 5:
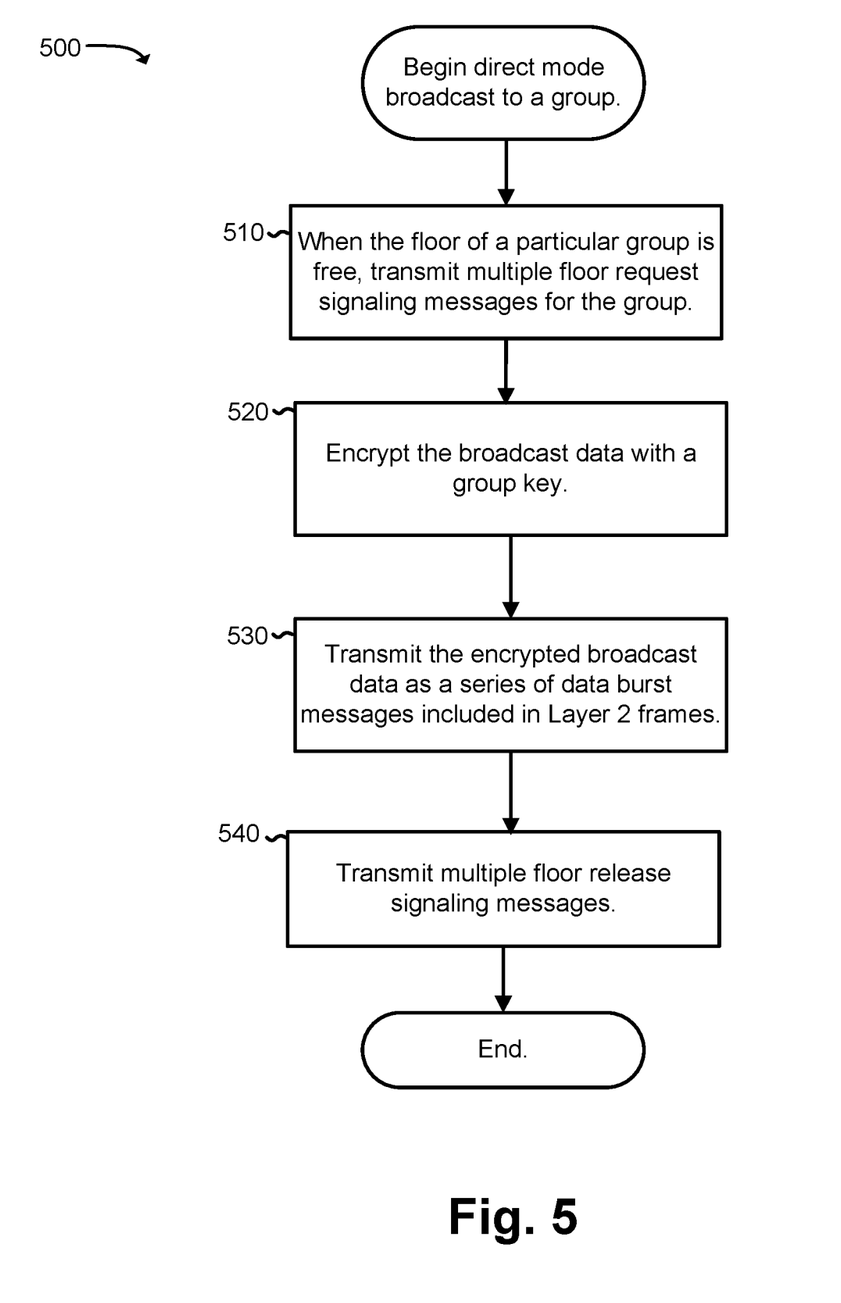
FIG. 5 is flow chart illustrating an example process for performing direct mode broadcast by a UE.

FIG. 5 is flow chart illustrating an example process 500 for performing direct mode broadcast by a UE. The direct mode broadcast may be to UEs that are associated with a particular group to which a user of the broadcasting UE belongs.

Process 500 may include, when the floor of the particular group is free, transmitting multiple floor request signaling messages directed to the group (block 510). As previously discussed, each floor request signaling message may be included in a Layer-2 frame (e.g., consistent with frame 300) with a destination address that is set to a broadcast MAC address corresponding to the particular group. Multiple frames may be transmitted to increase the chance that all UEs of the particular group receive the floor request signaling message. If the floor of the particular group is not free, other UEs in the particular group may refrain from requesting the floor. Each UE may locally keep track of whether the floor, for a particular group, is free (e.g., when a floor request, for a particular group is received, the UE may mark the floor for that group as taken and mark the floor for the group as free when the corresponding floor release message is received).

Process 500 may further include encrypting the broadcast data (e.g., the substantive data for the direct mode broadcast) with the group key corresponding to the particular group (block 520). As previously mentioned, UEs 110 may store a group key for each group for which the user of the UE is a member. Encrypting the broadcast data may provide for secure communications within a group.

Process 500 may further include transmitting the encrypted broadcast data as a series of Layer-2 frames that include data burst messages (block 530). In one implementation, the frames may be formatted as indicated for frame 340 (FIG. 3C). The formatting of the frames may be designed so that the encrypted broadcast data can be reassembled and unencrypted using the group key. The frames may be wirelessly transmitted to UEs 110 that are within direct mode communication range of the transmitting UE.

Process 500 may further include transmitting multiple floor release signaling messages (block 540). Each floor release signaling message may be formatted as illustrated for floor release signaling message in frame 320 (FIG. 3B). The floor release signaling message may indicate, to other UEs in the group, that the floor is now free for communications, and the other UEs may take control of the floor by being the next UE from the group to transmit a floor request message.

Figure 6:
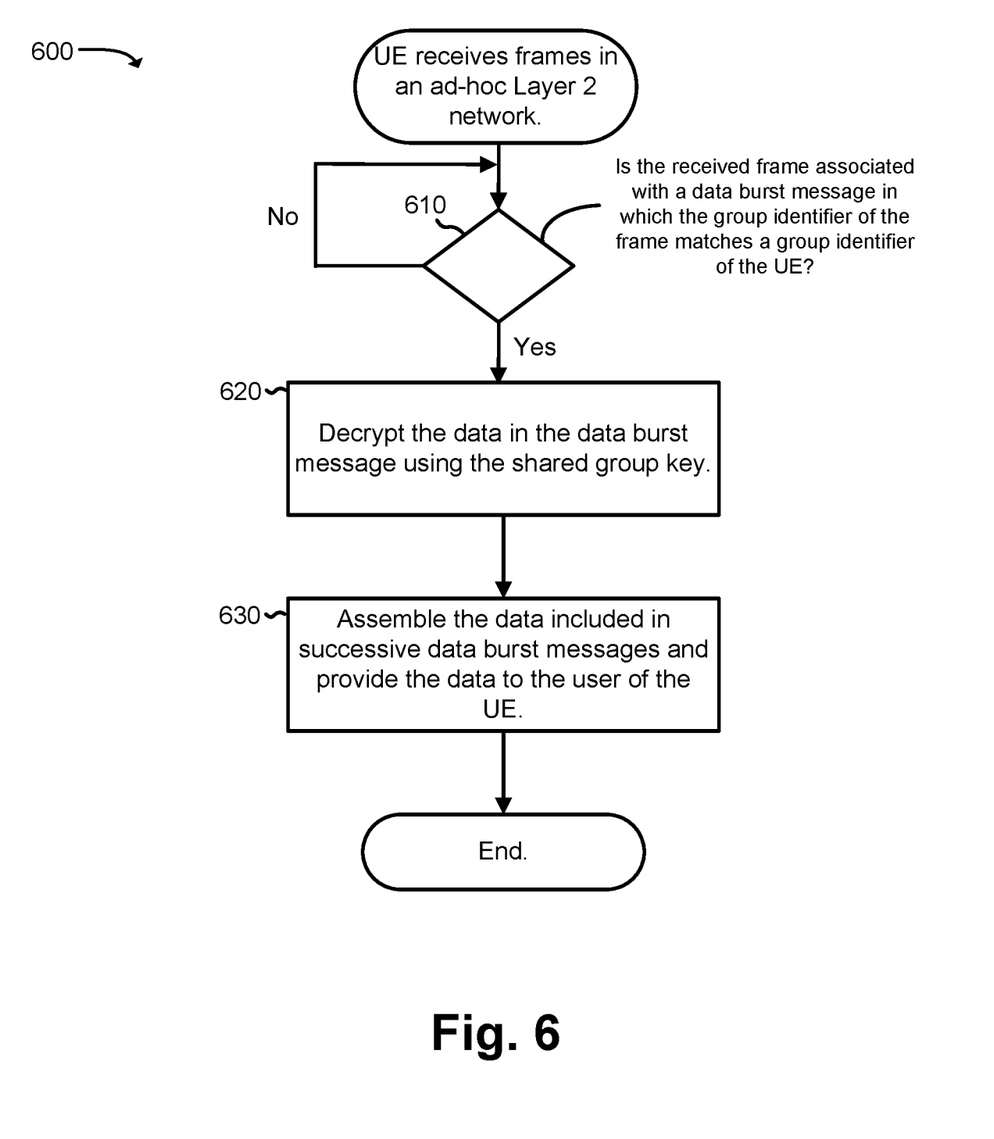
FIG. 6 is a flow chart illustrating an example process for receiving a direct mode broadcast by a UE.

FIG. 6 is a flow chart illustrating an example process 600 for receiving a direct mode broadcast by a UE. The receiving UE 110 may be in a Layer-2 ad-hoc network with the transmitting UE and process 600 may be performed in response to reception of a frame in the ad-hoc network.

Process 600 may include determining whether a received frame includes a data burst message in which the group identifier of the data burst message matches a group identifier of the UE (block 610). The receiving UE 110 may, for instance, compare group identifier 310, of the received frame, to the group identifiers 220 that are stored by the UE. A match (block 610—YES) may indicate that the UE is a member of the group. Otherwise, when the UE is not a member of the group (block 610—NO), the receiving UE 110 may discard the frame.

When the received frame is determined to include a data burst message for a group in which the receiving UE 110 is a member (block 610—Yes), process 600 may further include decrypting the data in the data burst message using the shared group key (block 620). For example, UE 110 may use group key 230, corresponding to the group associated with the data burst message, to decrypt the data in the data burst message. UEs 110 that are not associated with the group corresponding to a data burst message may receive the frame but may be unable to decrypt the data.

Process 600 may further include assembling the data included in successive data burst messages and providing the data to a user of the UE (block 630). For example, a number of data bursts messages may collectively include an audio broadcast. UE 110 may assemble the audio broadcast and play the audio broadcast for a user of UE 110. In other implementations, a series of data burst messages may include other types of information, such as video and/or text information.

The direct mode communications, as described above, are performed between UEs communicating with one another as an ad-hoc network of devices that is implemented based on Layer-2 communications. In addition to UEs, within a particular group, contending for the communication floor, UEs within the ad-hoc network may contend for the communication medium. Thus, a single ad-hoc network may include multiple UEs that may all contend for the communication medium and at the same time the multiple UEs may be logically associated with different groups (via application layer identifiers).

Figure 7:
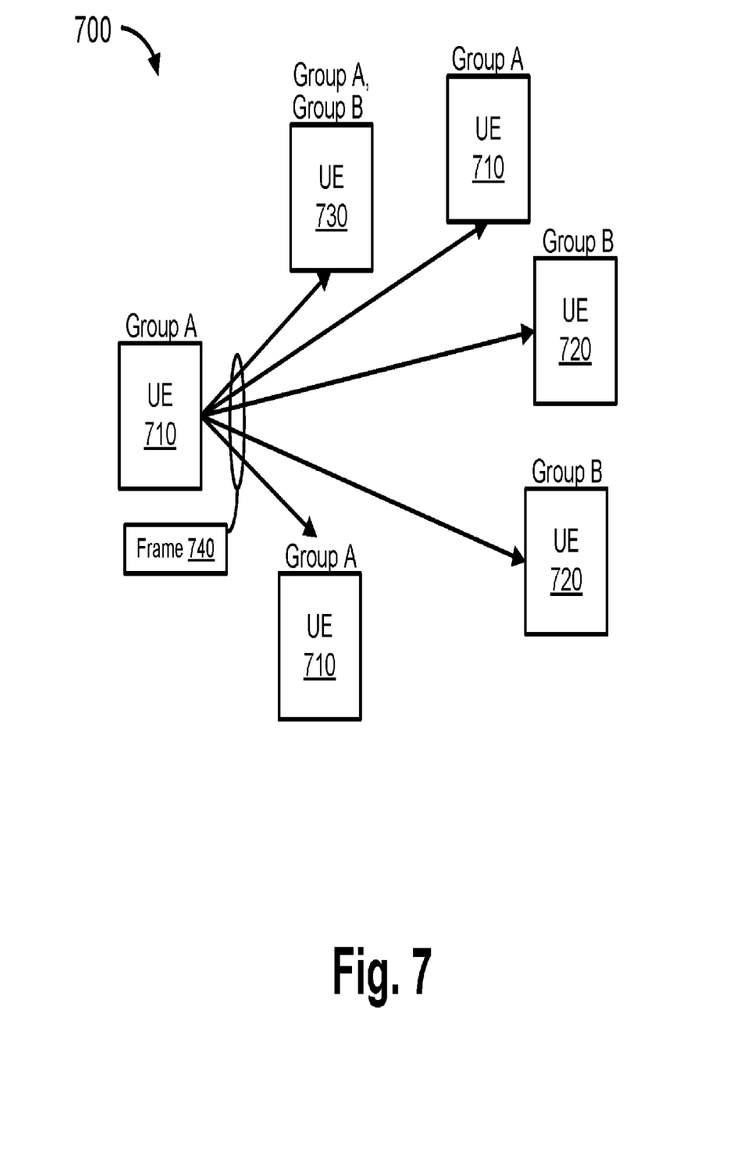
FIG. 7 is a diagram illustrating an example system in which UEs may be associated with different groups in the same wireless ad-hoc network.

FIG. 7 is a diagram illustrating an example system in which UEs may be associated with different groups in the same wireless Layer-2 ad-hoc network 700. As illustrated, an ad-hoc network 700 may include UEs 710, 720, and 730. UEs 710 may be associated with a first group ("Group A"), UEs 720 may be associated with a second group ("Group B"), and UE 730 may be associated with both Group A and Group B. All direct mode communications between UEs in ad-hoc network 700 may be transmitted to all other UEs in the ad-hoc network (illustrated in FIG. 7 as frame 740 being transmitted to all other UEs in ad-hoc network 700). In other words, UEs 710, 720, and 730 may all contend for the same Layer-2 communication medium. Requests for the floor, however, may be performed at the group level (e.g., between UEs within Group A or Group B). UE 730, which is in Group A and Group B, may simultaneously keep track of the floor state in both Groups A and B.

Figure 8:
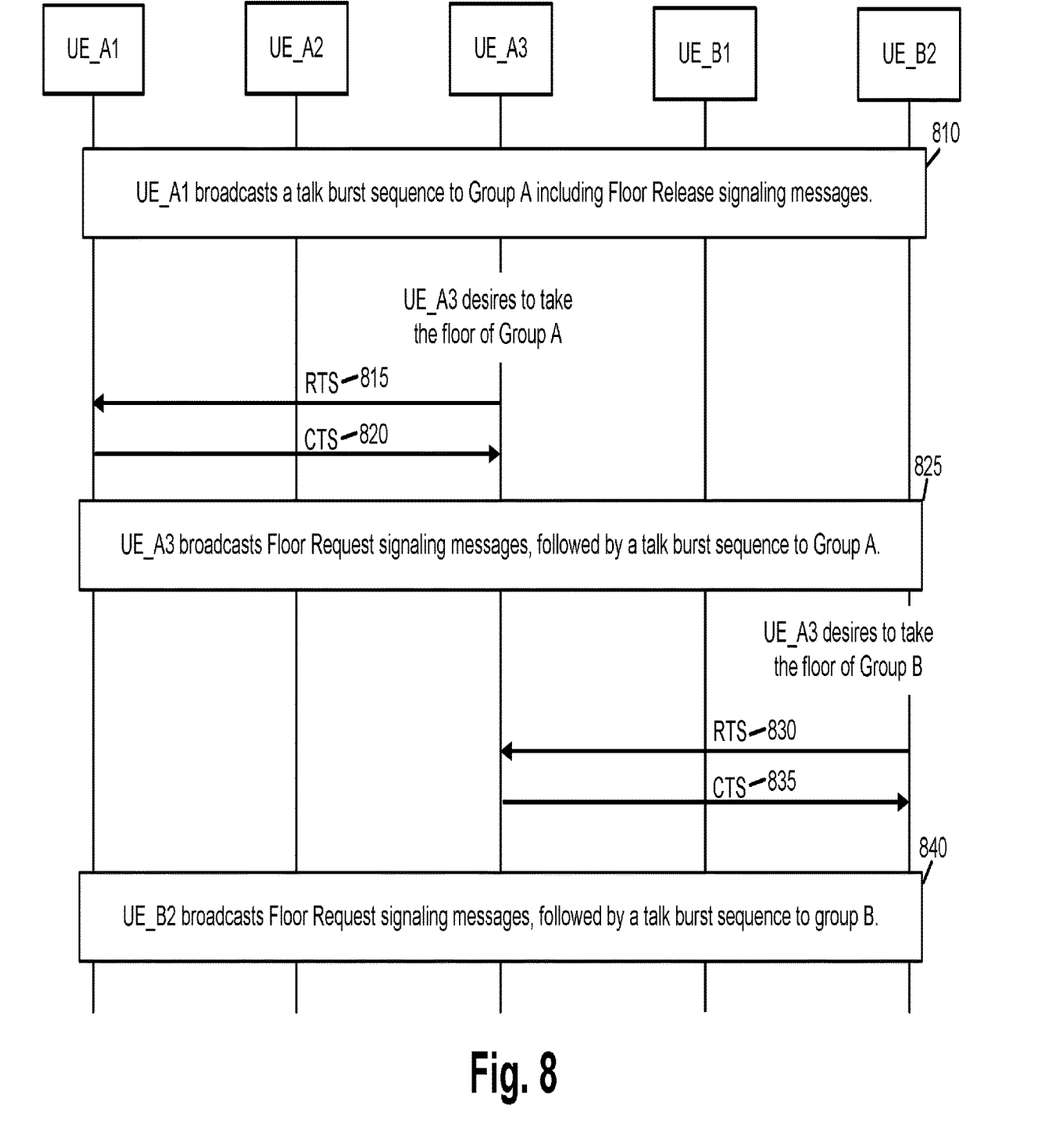
FIG. 8 is a diagram illustrating an example of signal flows, relating to the requesting of the communication floor, between UEs and groups in an ad-hoc network.

FIG. 8 is a diagram illustrating an example of signal flows, relating to the requesting of the communication floor, between UEs and groups in an ad-hoc network similar to network 700. As illustrated in FIG. 8, assume five UEs are in proximity to one another and form an ad-hoc network (UE-A1, UE_A2, UE_A3, UE_B1, and UE_B2). UE-A1, UE-A2, and UE-A3 may be in a first group ("Group A") and UE-B1 and UE-B2 may be in a second group ("Group B").

In the example of FIG. 8, all the UEs may communicate using a MAC protocol that relies on Request-To-Send/Clear-To-Send (RTS/CTS) control frames for collision detection. With RTS/CTS control frames, a UE wishing to content for the communication medium may transmit a RTS frame. The UE may refrain from taking control of the medium until it receives a CTS control frame.

Assume UE_A1 has control of the medium and control of the floor for group A. UE_A1 may transmit a talk burst sequence to group A, ending with a floor release signaling message (communication 810). At this point, assume UE_A3 may desire to take control of the floor for group A.

UE_A3 may transmit an RTS frame (communication 815) and receive back a CTS frame (communication 820). Receipt of the CTS frame, by UE_A3, may indicate that UE_A3 has taken control of the medium. UE_A3 may then broadcast floor request signaling messages, followed by a talk burst sequence to group A (communication 825).

At this point, assume that UE_B2 wishes to take the floor for group B. UE_B2 may transmit an RTS frame (communication 830) and receive back a CTS frame (communication 835) from UE_A3. Receipt of the CTS frame, by UE_B2, may indicate that the UE_B2 has taken control of the medium with respect to the ad-hoc network (e.g., with respect to UE-A1, UE_A2, UE_A3, UE_B1, and UE_B2). UE_B2 may then broadcast floor request signaling messages, followed by a talk burst sequence to group B (communication 840). While UE_B2 is transmitting the talk burst sequence to group B, UE_A3 may still control the floor for group A. However, because UE_A3 does not have control of the medium, UE_A3 may not be able to transmit additional talk burst messages until it regains control of the medium.

As discussed with respect to FIG. 8, multiple application layer groups may simultaneously be active in an ad-hoc network. Floor control within a group may be independently performed by each group while all UEs in the ad-hoc network may jointly contend for the medium.

Figure 9:
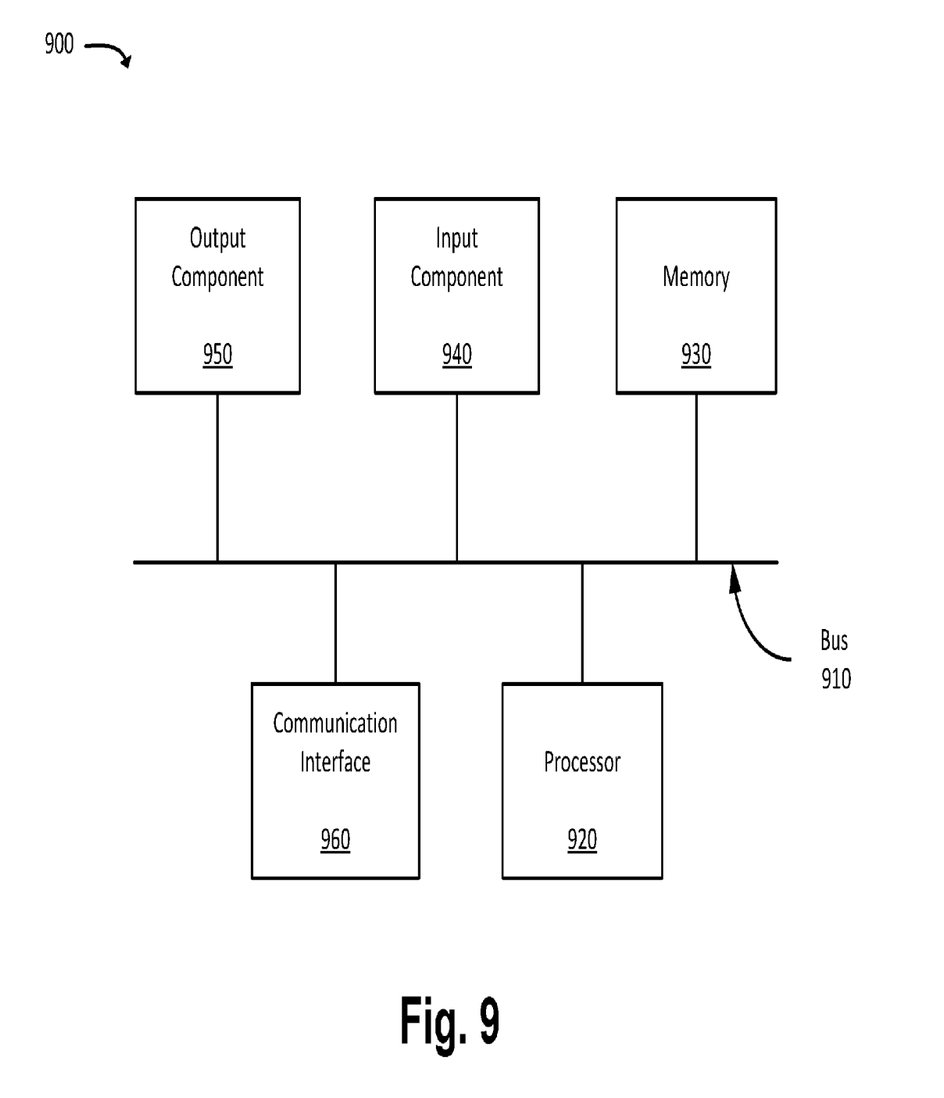
FIG. 9 is a diagram of example components of a device.

FIG. 9 is a diagram of example components of a device 900. Each of the devices illustrated in FIGS. 1, 2, 7, and 8 may include one or more devices 900. Device 900 may include bus 99, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-voltile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth® radio, a WiFi radio, a cellular radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks and/or signals have been described with regard to FIGS. 5, 6, and 8, the order of the blocks and/or signals may be modified in other implementations. Further, non-dependent blocks and/or signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A user equipment (UE) comprising:
   one or more processors; and
   one or more device-readable media having instructions stored thereon that, when executed by the one or more processors, in association with proximity-based direct communications with one or more other UEs of a group, cause the UE to:
   receive a first transmission including:
   a destination layer-2 address for a proximity-based direct communication, wherein the destination layer-2 address is based on a layer-2 group identifier (ID) of the group; and
   a source layer-2 ID indicating a source layer-2 address for the proximity-based direct communication;

determine that the first transmission potentially belongs to the group when a layer-2 destination address of the first transmission matches the layer-2 group ID;

determine, when the layer-2 destination address of the first transmission matches the layer-2 group ID, whether an upper layer group ID, associated with the first transmission, matches an upper layer group ID; and process the first transmission as belonging to the group when the upper layer group ID matches the upper layer group ID, wherein traffic received from the group is encrypted based on a group security key, wherein the group security key is common for all members of the group.

2. The UE of claim 1, wherein a security related parameter is attached to a payload portion of the first transmission.

3. The UE of claim 1, wherein the instructions further cause the UE to:

obtain a respective layer-2 group ID and a respective group security key for respective groups of a plurality of groups to which the UE belongs.

4. The UE of claim 1, wherein the instructions further cause the UE to:

transmit a floor request signaling message to take control of a communication channel before transmitting a second transmission to the one or more other UEs of the group.

5. The UE of claim 1, wherein the instructions further cause the UE to:

transmit a floor release signaling message to release a communication channel after transmitting a second transmission to the one or more other UEs.

6. The UE of claim 1, wherein the instructions further cause the UE to:

receive the first transmission a plurality of times.

7. The UE of claim 1, wherein the first transmission includes a security related parameter.

8. An apparatus comprising:

one or more processors configured to cause a user equipment (UE) performing proximity-based direct communications with one or more other UEs of a group to:

receive a first transmission including:
a destination layer-2 address for a proximity-based direct communication, wherein the destination layer-2 address is based on a layer-2 group identifier (ID) of the group; and
a source layer-2 ID indicating a source layer-2 address for the proximity-based direct communication;

determine that the first transmission belongs to the group when a layer-2 destination address of the first transmission matches the layer-2 group ID and an upper layer group associated with the first transmission, matches an upper layer group ID, wherein traffic received from the group is encrypted based on a group security key, wherein the group security key is common for all UEs associated with the layer-2 group ID.

9. The apparatus of claim 8, wherein a security related parameter is attached to a payload portion of the first transmission.

10. The apparatus of claim 8, the one or more processors further configured to cause the UE to:

obtain a respective layer-2 group ID and a respective group security key for respective groups of a plurality of groups to which the UE belongs.

11. The apparatus of claim 8, the one or more processors further configured to cause the UE to:

transmit a floor request signaling message to take control of a communication channel before transmitting a second transmission to the one or more other UEs associated with the layer-2 group ID.

12. The apparatus of claim 8, the one or more processors further configured to cause the UE to:

transmit a floor release signaling message to release a communication channel after transmitting a second transmission to the one or more other UEs.

13. The apparatus of claim 8, the one or more processors further configured to cause the UE to:

receive the first transmission a plurality of times.

14. A method, comprising:

a user equipment (UE) performing proximity-based direct communications with one or more other UEs of a group:

generating a first transmission including:
a destination layer-2 address for a proximity-based direct communication, wherein the destination layer-2 address is based on a layer-2 group identifier (ID) of the group; and
a source layer-2 ID indicating a source layer-2 address for the proximity-based direct communication;

determining that the first transmission potentially belongs to the group when a layer-2 destination address of the first transmission matches the layer-2 group ID;

determining, when the layer-2 destination address of the first transmission matches the layer-2 group ID, whether an upper layer group ID, associated with the first transmission, matches an upper layer group ID; and processing the first transmission as belonging to the group when the upper layer group ID matches the upper layer group ID, wherein traffic received from the group is encrypted based on a group security key, wherein the group security key is common for all members of the group.

15. The method of claim 14, wherein a security related parameter is attached to a payload portion of the first transmission.

16. The method of claim 14, further comprising:

obtaining a respective layer-2 group ID and a respective group security key for respective groups of a plurality of groups to which the UE belongs.

17. The method of claim 14, further comprising transmitting a floor request signaling message to take control of a communication channel before transmitting a second transmission to the one or more other UEs of the group.

18. The method of claim 14, further comprising transmitting a floor release signaling message to release a communication channel after transmitting a second transmission to the one or more other UEs.

19. The method of claim 14, wherein the first transmission includes a security related parameter.

20. The method of claim 14, further wherein the first transmission is received a plurality of times.

* * * * *

UNITED STATES PATENT AND TRADEMARK OFFICE
CERTIFICATE OF CORRECTION

PATENT NO. : 11,317,377 B2
APPLICATION NO. : 16/833895
DATED : April 26, 2022
INVENTOR(S) : Alexandre Stojanovski et al.

It is certified that error appears in the above-identified patent and that said Letters Patent is hereby corrected as shown below:

In the Claims

Column 14, Line 20, delete "generating" and insert --receiving--.

Signed and Sealed this
Twenty-seventh Day of June, 2023

Katherine Kelly Vidal
*Director of the United States Patent and Trademark Office*